No. 652,736. Patented June 26, 1900.
P. H. A. BALSLEY.
PLANT GUARD AND SUPPORT.
(Application filed Jan. 11, 1899.)
(No Model.)
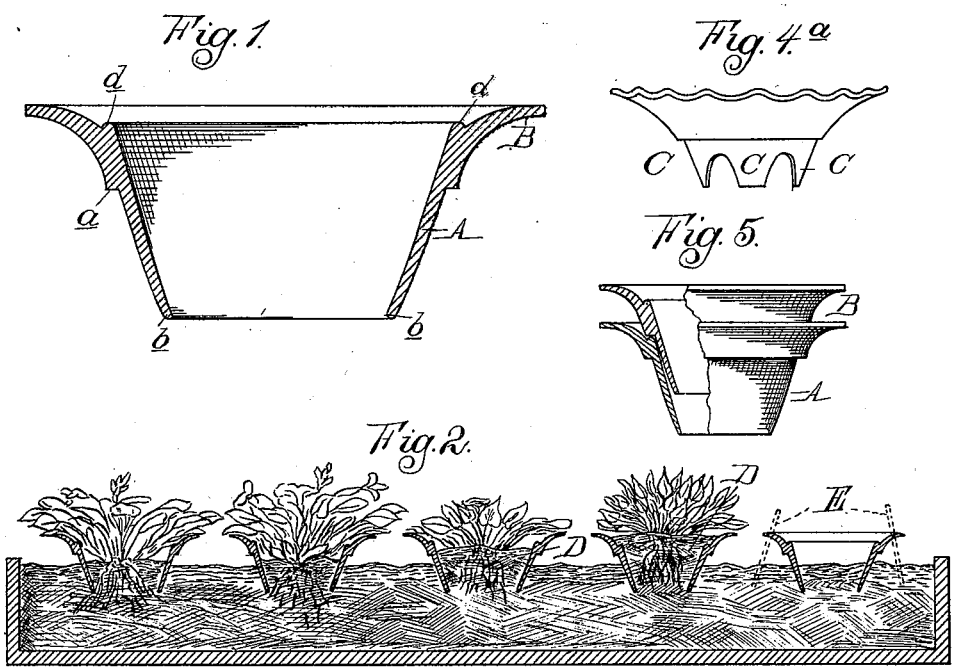
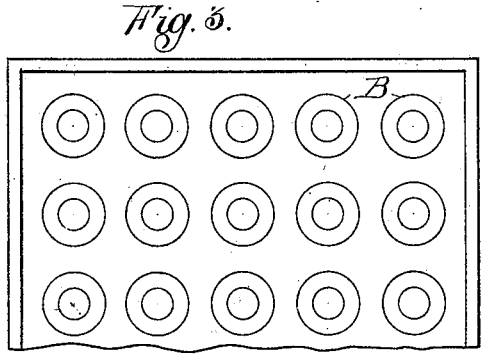
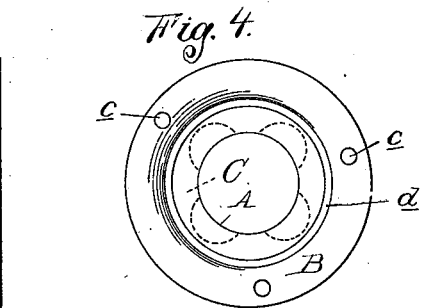
Witnesses:
Inventor:
Philip H. A. Balsley,
By Adolph Barthel
Attorney.

UNITED STATES PATENT OFFICE.

PHILIP H. A. BALSLEY, OF DETROIT, MICHIGAN, ASSIGNOR OF TWO-THIRDS TO THEODORE S. BALSLEY AND GEORGE S. BALSLEY, OF SAME PLACE.

PLANT GUARD AND SUPPORT.

SPECIFICATION forming part of Letters Patent No. 652,736, dated June 26, 1900.

Application filed January 11, 1899. Serial No. 701,797. (No model.)

*To all whom it may concern:*

Be it known that I, PHILIP H. A. BALSLEY, a citizen of the United States, residing at Detroit, in the county of Wayne and State of Michigan, have invented certain new and useful Improvements in Plant Guards and Supports, of which the following is a specification, reference being had therein to the accompanying drawings.

My invention is intended to facilitate the raising in greenhouses or under glass of plants and flowers, especially low-growing plants, such as violets, carnations, and other favorite flowers. The raising of such plants in greenhouses is attended with many difficulties—as, for instance, in growing violets on a commercial scale in the hothouse the florist experiences much loss from a variety of plant diseases, such as rot, owing to the difficulty of maintaining at all times the proper conditions of moisture, temperature, ventilation, &c., which conditions are especially difficult to maintain with violets and like low-growing plants, where the leaves and flower-stalks have a tendency to lodge upon the ground. This lodging also facilitates the propagation and destructiveness of wood-lice, wireworms, and other hothouse pests and makes their eradication difficult.

The object of my invention is primarily to enable the florist to guard against all these difficulties, and to this end I have invented a plant guard and support which not only accomplishes the desired object, but in addition secures other advantages which makes its use a source of increased profit by enabling the florist to grow more and better plants to a given area, all as more fully hereinafter described, and shown in the accompanying drawings, in which—

Figure 1 is a vertical central section of my plant guard and support. Fig. 2 is a vertical section through a box such as is used for growing plants in hothouses and shows my guard as in use. Fig. 3 is a plan view of such a box with my plant guards and supports disposed therein. Fig. 4 is a plan view of a plant guard and support slightly modified. Fig. 4ª is a side elevation thereof. Fig. 5 shows two of my plant guards and supports superimposed upon each other.

My plant guard and support in general appearance and shape may be likened to a shortened flower-pot, except that it is entirely open at the bottom and is surrounded on top with an outwardly-flaring rim.

The body portion A, which forms a conical frustum, is of larger diameter in proportion to its height and preferably more conical than the body portion of a flower-pot would ordinarily be, and below the rim portion it has an offset $a$, which forms an overhanging shoulder. At the lower end the body portion is rounded off, as at $b$, and forms the opening in the bottom.

The rim B is made to flare upwardly and outwardly and considerably overtops the body. It may be entirely imperforate or it may have perforations or holes $c$, as shown in Fig. 4, which shows a modified construction, in which the body A is divided by deep scallops into separate legs C.

At the inner margin between the body and the rim is formed a shoulder $d$, which corresponds to the shoulder $a$ on the body in such manner that if two of the guards are superimposed upon each other, as in Fig. 5, the shoulder $a$ of the upper one will rest upon the shoulder $d$ of the lower one and support the upper one loosely upon the lower one. These guards are preferably formed from porous clay in the same manner as flower-pots are made; but they may be constructed of wood-pulp or other substitute. In practice these guards are used by setting them over the plants in the box in which they are grown, as shown in Fig. 2, and to this end they are pressed into the ground a little distance, and when so used it will be seen that the leaves and stalks of a low-growing plant, such as violets, are prevented from lying on the ground, which is the primary cause of the rot. Besides, the air has now a chance to circulate and enter and purify the ground and prevent it from becoming sour and soggy, besides affording more facility for watering the ground in the open spaces between the guards or cultivating it. There are many other benefits arising from the use of these guards, such as the more vigorous growth resulting from the roots being kept more uniformly moist, and the evaporation of the water absorbed by the guard keeps the air around the plant cool, which is beneficial to the health of plants exposed to the heated atmosphere of a greenhouse. My guards also accomplish the object of protecting the plants from the ravages of insects, which now are deprived of their hiding and breeding places and cannot crawl up on the outside of the guards, owing to the offset on the body and overhanging rim. A principal advantage is, further, that with the guards about twenty per cent. more plants may be grown in a given area, which is a large gain where space is so valuable as in a greenhouse, and not only this, but as the ground may be raised inside of the guards, as shown at D in Fig. 2, the box may be made shallower, and this makes a considerable saving in the amount of soil required per box or bench. In case high-growing flower-stalks need extra support the holes $c$ in the rim afford facility for inserting stakes, and stakes, as E, may also be used to prevent the guard from tipping over or being accidentally displaced.

Other uses for my guards will suggest themselves readily to the experienced florist and gardener, such as raising the ground around the plant to a greater height when the plants need more earth or more top soil to enrich or to protect exposed roots or to apply a mulch to the top, which the guard will hold in place around the root. Also in outdoor gardening for the protection of seedlings and young plants my guard will be often found of great use.

I do not limit myself to any particular proportion of the parts, as I intend to use the proportions and sizes most appropriate for any particular plant, flower, or vegetable. Where plants require plenty of room for their roots, I prefer the construction shown in Fig. 4$^a$, which permits the roots to spread out between the legs, and for plants with particularly long and tender leaves the rim may be more extended and the body more of a funnel shape.

My invention is not only designed to facilitate the raising of certain flowers, but I have also found it to be of great benefit in raising vegetables under glass or in hothouses, especially for raising lettuce, where the use of my plant-guard will preserve every leaf in good condition. Further, my invention permits the practice of entirely new methods in horticulture, as with the leaves raised off the ground the system of irrigating or flooding the benches can be practiced, which is not only more expeditious than the old way of sprinkling water over the top, but insures better results all around, as the flowers produced are finer and last longer and diseases are less liable to occur and less apt to spread.

What I claim as my invention is—

1. In a plant guard and support, the combination of the open-ended pot-shaped conical body portion A, forming with its upper end the rest or shoulder $d$ for a superimposed guard, the outwardly-flaring rim substantially in a plane with the top of the body portion forming the supporting means for the leaves of the plant contained therein and a shoulder $a$ formed by the lower edge of said flange, adapted to form the supporting means for the guard when superimposed within another guard.

2. In a plant guard and support, the combination of the conically-shaped body portion A having the legs C, the outwardly-flaring rim B, and the perforations $c$ in the rim.

3. In a plant guard and support, the combination of the conically-shaped, open-ended body portion A adapted to form a pot for the growing of a plant therein, an annular shoulder $a$ on said body portion adapted to form a support for said body portion, legs C formed on said body portion below said annular shoulder, and the outwardly-flaring rim B having its upper surface substantially in a plane with the top of the body portion and its under surface curved upwardly and outwardly.

In testimony whereof I affix my signature in presence of two witnesses.

PHILIP H. A. BALSLEY.

Witnesses:
OTTO F. BARTHEL,
V. D. KINNER.